Patented Jan. 26, 1932

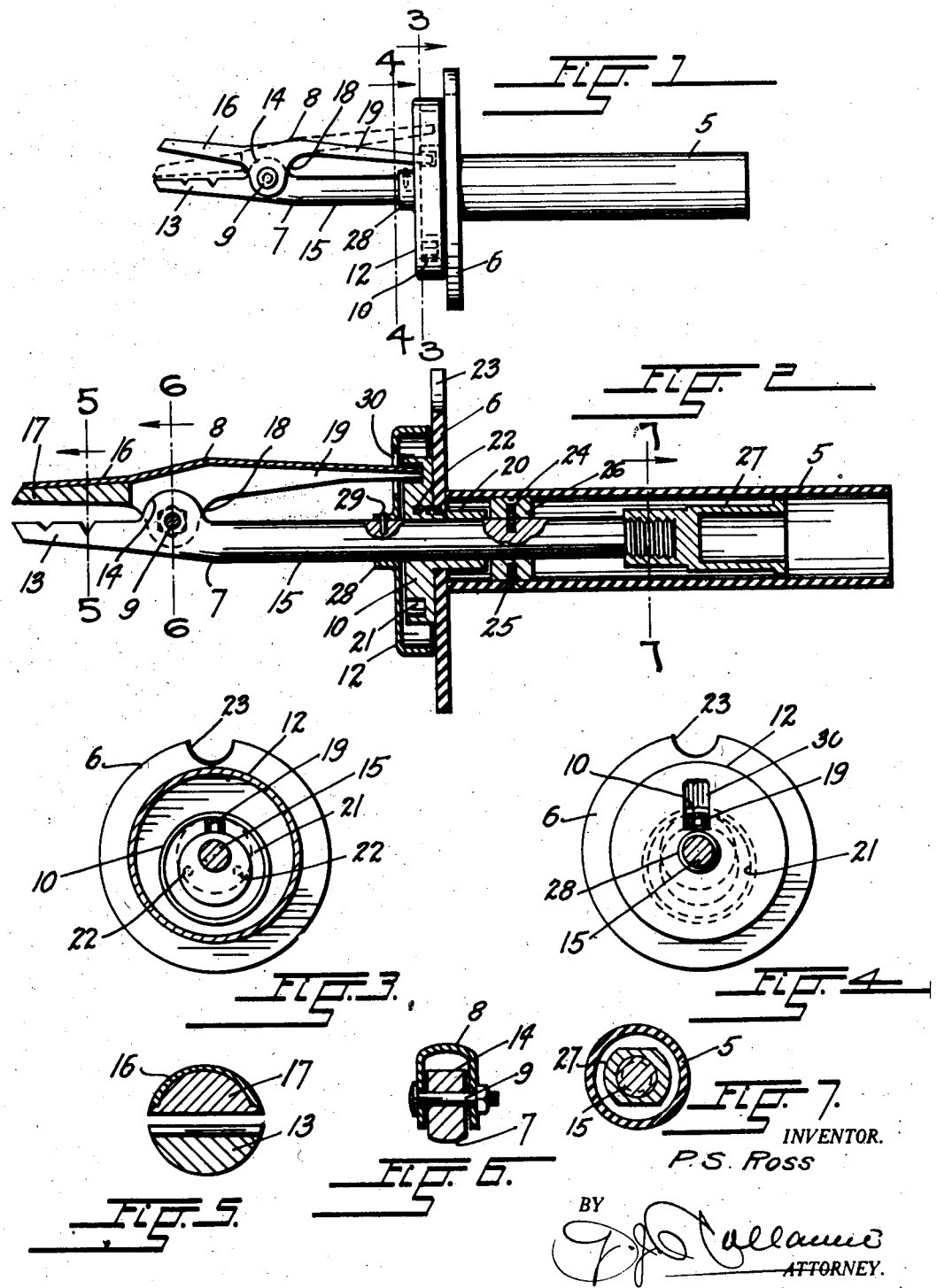

1,842,627

UNITED STATES PATENT OFFICE

PAUL S. ROSS, OF DENVER, COLORADO

ELECTRODE HOLDER

Application filed January 28, 1929. Serial No. 335,486.

This invention relates to electrode holders for use in electric welding and its principal object is to provide a tool of simple construction adapted to grasp electrodes of different sizes with variable pressure and without the use of springs.

Another object of the invention resides in providing means for the operation of a movable jaw of the tool, in conjunction with a shield that protects the hand of the operator.

Further objects reside in an improved method of insulating the handle of the tool and in details of construction and a novel arrangement of parts, all of which have been shown in the preferred embodiment of the invention illustrated in the accompanying drawings.

In the drawings, in the several views of which like parts have been similarly designated, Figure 1 represents an elevation of the improved electrode holder, Figure 2, an enlarged longitudinal section of the same, Figure 3, an enlarged section along the line 3—3, Figure 1, Figure 4, an enlarged section taken on the line 4—4, Figure 1, Figure 5, a section along the line 5—5, Figure 2, Figure 6, a section on the line 6—6, Figure 2, and Figure 7, a section along the line 7—7, Figure 2.

The tool, as shown, comprises a hollow handle 5 of fiber or other insulating material, a protective shield 6 of similar material, a stationary gripping member 7, a movable gripping member 8 fulcrumed for movement with relation to the relatively stationary member by a bolt 9, a rotary cam-element 10 for the operation of the movable jaw-member, and a housing 12 for the rotary cam.

The stationary gripping member, preferably made of copper, has a jaw 13 transversely notched to engage electrodes of different diameters either in the notches or between the same, ears 14 for the pivotal connection of the movable member, and a shank 15 upon which the operating parts of the tool are assembled.

The movable gripping member may be made of channeled steel or other strong metal. Its jaw 16 has a copper inlay 17 to co-operate with the jaw of the stationary member, it has ears 18 that lap the ears of the stationary member for their pivotal connection by means of the before mentioned fulcrum-bolt 9, and it has an arm 19 projecting rearwardly from the fulcrum to engage with the rotary cam which functions to press the jaws of the members together so as to firmly grip an electrode between them.

The cam consists of a circular disk having a central collar 20 for its firm support upon the shank 15. The disk has in its forward face, an eccentric groove 21 into which the end of the arm 19 of the movable jaw loosely extends and it is connected with the circular shield of the tool by a dowel pin 22.

The shield fitted upon the collar of the cam lies flat against the rearward side of the same, and it has a notch 23 to facilitate its rotation by the insertion of the thumb on the hand of the operator, that holds the tool in the welding operation.

The hollow cylindrical handle 5 is concentric with the shank of the stationary gripping member and extends beyond the end thereof. It abuts against the shield and it is fastened to the shank by means of screws 24 and 25 and an annular filler 26 in the space between the handle and the shank. The shank is screw-threaded at its end within the handle for the attachment of a chuck 27 to which, in practice, the electric cable is attached by means of solder.

The chuck has opposite flat faces for the application of a wrench, it being essential that the joint between the shank and the chuck be kept tight to prevent leakage of electricity.

It is to be noted that the air-space between the shank and the handle aids in insulating the conductive parts from the hand in which the tool is held.

The cam is enclosed in the housing 12 consisting of a flanged metal cover having a collar 28 for its attachment to the shank by means of a pin 29. The housing protects the cam wheel from sparks produced in the welding operation and it has an opening 30 through which the end of the arm of the movable jaw passes, to enter the groove of the cam.

It will be seen that inasmuch as the opening in the housing is occupied by the arm of the movable jaw at its portion opposite the cam-groove, no sparks can enter the groove through the opening.

In the use of the tool, the electrode is placed between the jaws of the gripping member and the cam is rotated by means of the shield until the electrode is rigidly clamped in place.

The pressure upon the electrode may be increased to any desired extent and the inherent resiliency of the channeled movable gripping member increases the pressure of its jaw upon the electrode.

The copper inlay is highly conductive and cooperates with the copper stationary jaw to dissipate a large amount of the heat generated at the electrode, before it can reach the handle of the tool.

The absence of springs greatly increases the life of the tool since it is well known that in similar tools employing springs to press the jaws together, the springs loose their tension and otherwise deteriorate in a short time. Moreover, the pressure exerted by the spring is constant whereas in the present tool the pressure produced by the action of the cam in the movable jaw is variable to any required degree.

What I claim and desire to secure by Letters Patent is:

1. An electrode holder comprising a pair of gripping members, one of which is fulcrumed to move toward the other; the fulcrumed member having an arm extending from its fulcrum and the other member having a shank beyond the fulcrum, a rotary cam mounted to rotate about the shank of the one member, in operative engagement with the arm of the other member, and a handle around the shank rearward of the cam.

2. An electrode holder comprising a pair of gripping members, one of which is fulcrumed to move toward the other, the fulcrumed member having an arm extending from its fulcrum and the other member having a shank beyond the fulcrum, a rotary cam mounted to rotate about the shank of the one member, in operative engagement with the arm of the other member, a handle around the shank rearward of the cam, and a shield forward of the handle in operative connection with the cam.

3. An electrode holder comprising a pair of gripping members, one of which is fulcrumed to move toward the other, the fulcrumed member having an arm extending from its fulcrum and the other member having a shank beyond the fulcrum, and a rotary cam mounted to move about the shank of the one member, and having in its face, an eccentric slot engaging with the arm of the other member.

4. An electrode holder comprising a pair of gripping members, one of which is fulcrumed to move toward the other, the fulcrumed member having an arm extending from its fulcrum and the other member having a shank beyond the fulcrum, a rotary cam mounted to move about the shank of the one member, and having in its face, an eccentric slot engaging with the arm of the other member, and a housing for the cam, having an opening to admit the arm to the slot of the same.

5. An electrode holder comprising a pair of gripping members one of which is fulcrumed to move toward the other member, said other member having a handle, a rotary cam mounted on the handle and operatively engaging the fulcrumed member to move it to and from the handled member, and a protective shield mounted on the cam and surrounding the handle in transverse relation thereto.

6. An electrode holder comprising a pair of gripping members one of which is fulcrumed to move toward the other member, said other member having a handle, a rotary cam mounted on the handle and operatively engaging the fulcrumed member to move it to and from the handled member, a protective shield mounted on the cam and surrounding the handle in transverse relation thereto, and a housing mounted on the handle and cooperating with the shield to enclose the cam.

7. An electrode holder comprising a pair of gripping members, one of which is fulcrumed to move toward the other, and a cam rotatably mounted on one of the members, the cam having an eccentric groove engaged by the other member.

8. An electrode holder comprising a gripping element composed of a pair of jaw members, one of which is fulcrumed to move toward the other, one of said members having a handle, a shield mounted on the handle, and a rotary cam mounted on the shield in engagement with the fulcrumed member to move the same about its fulcrum.

In testimony whereof I have affixed my signature.

PAUL S. ROSS.